United States Patent [19]
Johnson et al.

[11] Patent Number: 4,854,074
[45] Date of Patent: Aug. 8, 1989

[54] INJECTION CAPSULE FOR TREATING TREES

[75] Inventors: Robert E. Johnson, West Vancouver; William R. Dinsmore, Burnaby, both of Canada

[73] Assignee: Powertech Labs Inc., Surrey, Canada

[21] Appl. No.: 178,094

[22] Filed: Apr. 6, 1988

[51] Int. Cl.$^4$ ............................................. A01G 29/00
[52] U.S. Cl. ..................................................... 47/57.5
[58] Field of Search ................ 47/57.5, 48.5; 411/371, 411/372

[56] References Cited

U.S. PATENT DOCUMENTS

| | | | |
|---|---|---|---|
| 98,300 | 12/1869 | Roemer | 411/371 |
| 2,970,348 | 2/1961 | Imus et al. | 47/57.5 |
| 3,074,207 | 1/1963 | Laing | 47/57.5 |
| 3,706,161 | 12/1972 | Jenson | 47/57.5 |

FOREIGN PATENT DOCUMENTS 1191346  8/1985  Canada ................................. 47/57.5
786083  11/1957  United Kingdom ................. 47/57.5

Primary Examiner—Robert A. Hafer
Assistant Examiner—Charles H. Sam
Attorney, Agent, or Firm—Townsend and Townsend

[57] ABSTRACT

An injection capsule to treat trees and woody plants comprising a receptacle portion to hold a chemical to treat trees and woody plants. The receptacle portion has a closed end and an open end, the closed end being formed with a bore extending internally through the receptacle portion from the closed end to the open end. The bore houses a screw fastener, movable along the length of the bore and guided by the walls of the bore, to allow the injection capsule to be attached to a tree or woody plant. The bore is formed with a narrowed diameter section to limit the travel of the screw fastener as it is pushed through the internal bore and driven into a tree or woody plant in order to hold the open end of the injection capsule tightly against the tree or woody plant.

4 Claims, 1 Drawing Sheet

U.S. Patent   Aug. 8, 1989   4,854,074
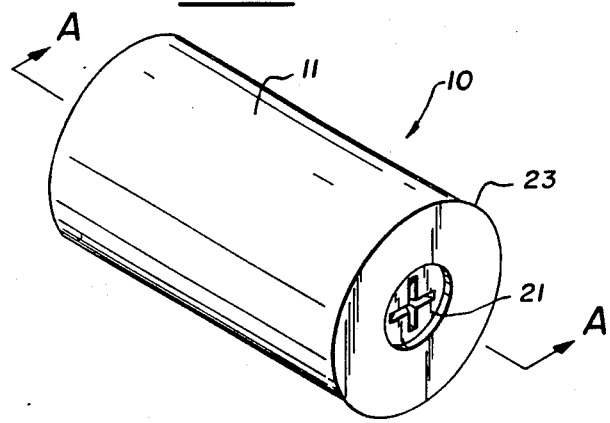
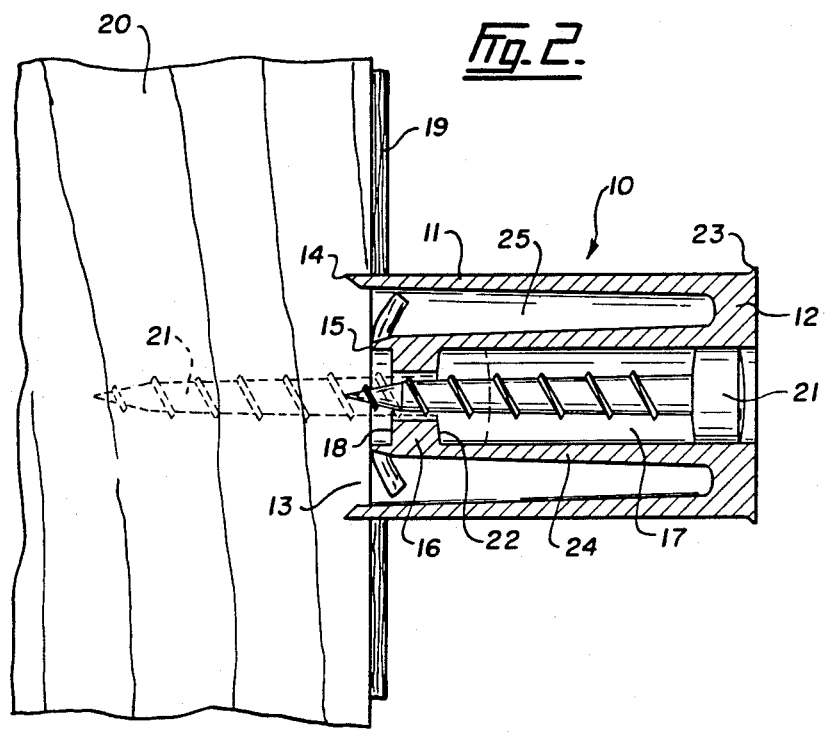

INJECTION CAPSULE FOR TREATING TREES

This invention relates to an injection capsule for administering chemical substances to trees and woody plants.

DESCRIPTION OF THE PRIOR ART

Excessive vertical growth of trees on utility rights-of-way can damage electrical transmission systems and cause danger to life, consequently, such growth must be controlled. This can be accomplished by selectively injecting herbicides or growth-retarding chemicals into tall-growing trees to encourage the development of a stable community of low-growing plants that will not interfere with the overhead transmission lines.

There is a large body of prior art detailing methods and devices for administering chemicals to trees:

U.S. Pat. No. 3,691,683 to Sterzik teaches a blunt hammer-axe to drive an injection cartridge into the tree, causing the end cap of the cartridge to rupture upon impact, thereby releasing the herbicide contained within. Leakage can occur with this device if the operator does not successfully place the device with his first blow.

U.S. Pat. No. 4,110,933 to Haggblom teaches a process for killing trees or woody plants that uses a pistol having a magazine, loading spring and a number of biocide wedges. Chemicals contained in a recess of the wedges are absorbed by the tree. Again, there is a risk of leakage of the chemical from the tree.

U.S. Pat. No. 3,074,207 to Laing discloses a device for treating trees that employs a nail, screw, pin or the like, coated with a water-soluble glue containing ocean salt and certain trace elements. The device is driven into a tree. The requirement for a hard coating limits the chemicals which can be used and there is a risk of leakage of the chemical both before and after installation.

U.S. Pat. No. 3,461,588 to Johnson discloses an explosively-operated injection gun for treating trees that forces a needle into the bark of a tree by firing a cartridge and then forces a measured supply of herbicide from a supply reservoir through the needle. Leakage of the chemicals is possible.

U.S. Pat. No. 1,080,960 to Kleckner teaches a device consisting of a cap which contains a number of capsules. These are held against a section of a tree, which has had its bark removed. Spurs hold the device in position until staples can be driven home. The disadvantages of this method are that it is necessary to remove a portion of bark prior to use and leakage is possible.

U.S. Pat. No. 3,706,161 to Jenson discloses a tree medication capsule that dispenses medication into the tree when forced into a pre-drilled hole. Barbs prevent the capsule from being removed. Pre-drilling of the tree is required and leakage is possible.

U.S. Pat. No. 3,968,594 to Kawakami discloses a method and apparatus for the chemical treatment of trees comprising a self-tapping applicator head having a centrally-defined passageway in its shank, a number of output orifices at its tip and an internally-threaded hole. In use, a hole is first drilled in the tree, the applicator is inserted and the chemicals passed into the tree under pressure through a hose line secured to the internal threaded hole. The common problem of chemical leakage is again present.

Canadian Pat. No. 1,191,396 to Dillistone discloses an open-ended capsule partially filled with a solid or semi-solid soluble substance which is driven into the tree by manual force using an elongated lance. The open end of the capsule, must penetrate the bark under the axial force of the lance and it must remain in place without allowing the chemical substance to leak. A disadvantage is seen in relatively young trees, where only a small force would be required to dislodge such capsules, posing a leakage hazard.

British Pat. No. 786,083 to Caughey teaches a cup-shaped receptacle and a fastener member for attaching the receptacle to the tree. The cup may be of any shape, open at one end and the fastener may be a nail or screw or the like.

The most common problem with the prior art methods and devices for administering chemicals to trees is the fact that leakage of the chemical agent can occur after the tree has been treated. As well, many of the methods for applying the chemical are slow and awkward and not suited to large scale treatment of trees.

SUMMARY OF THE INVENTION

Therefore, there is a need for simple disposable capsules that can be mass produced and easily and safely used in the field in large quantities.

Accordingly, the present invention comprises an injection capsule for treating trees that comprises a receptacle portion to hold a chemical to treat trees and woody plants, said receptacle portion having a closed end and an open end, said closed end being formed with a stem having an internal bore extending through the receptacle portion from said closed end to said open end and housing fastening means, movable along the length of said bore and guided by the walls of said bore, to allow the injection capsule to be attached to a tree or woody plat, said bore being formed with a narrowed diameter section to limit the travel of said fastening means as said fastening means is pushed through said internal bore and driven into a tree or woody plant in order to hold the open end of said injection capsule tightly against said tree or woody plant.

The injection capsule of the present invention firmly attaches to the tree and thereby minimizes the leakage problems associated with the prior art. Such an injection capsule is easily manufactured from suitable plastic materials, is readily and quickly installed in the field, and requires no pre-drilling of the tree to make the capsule effective. While special tools can be used for the application of the injection capsule, the capsule can be applied with a single screwdriver.

Preferably, however, the injection capsule device of the present application is fastened to a tree or woody plant using the injection tool described in copending application serial No. 178,677 entitled "INJECTION TOOL FOR TREATING TREES". This injection tool has a specially shaped cavity to receive and hold an injection capsule of the present invention. The injection tool also has a powered driving implement that is used to drive the fastening means of the injection capsule into a tree thereby allowing for rapid and easy installation of the injection capsules.

DESCRIPTION OF THE DRAWINGS

The injection capsule of the present invention is illustrated in the following figures in which:

FIG. 1 shows an injection capsule according to the present invention; and

FIG. 2 is a sectioned view of the injection capsule taken along line A—A of FIG. 1 showing the method of attachment of the capsule to the trunk of a tree; Referring to FIGS. 1 and 2, an injection capsule 10 is shown for administering a chemical to a tree or woody plant. The device comprises a main body 11 which houses a gelled chemical in cavity 25 between the outer wall of said main body and an internal stem 24, the main body having a closed end 12 and an open end 13. The outer shape of the capsule 10 is generally cylindrical, however, the capsule has flared lip 23 about the periphery of closed end 12. Capsule 10 is formed with an internal boss 16 at the end of a bore 17 which extends through stem 24 as the stem extends inwardly from the closed end 12 along the axis of the main body 11. Prior to installation on the tree, metal screw fastener 21 is completely contained in the bore 17 of the capsule and remains in the position illustrated, using solid lines, in FIG. 2 through friction with the boss 16. Complete enclosure of the screw is an important feature of the present invention, allowing for easy handling of the capsule by automated machinery during the process of filling the capsule with gelled chemical. It also allows for easier packaging of the filled capsules for transport, prior to installation.

When the capsule is installed on the tree 20, contact is initially made between the edge 14 of the capsule and the bark 19. The screw fastener 21 is rotated and because of the restraint against rotation provided by the contact between the edge 14 of the capsule and the bark 19 the screw fastener advances through boss 16 until its head comes to a stop against the mating surface 22 of the boss 16. This position is shown by the dash lines in FIG. 2.

The open end 13 of the capsule is tapered or sharpened at the outside edge 14 and at the edge of annular extension 15 to the boss 16. The relative positions of sharpened edges 14 and 15 are such that, as the screw fastener 21 advances, sharpened edge 14 cuts through the bark of the tree and penetrates into the tissues beneath the bark, and sharpened edge 15 also cuts through the bark and penetrates into the tissues beneath until the outer surface of the bark contacts surface 18 of the boss 16. By this means an annular section of bark is separated from the main body of the tree bark 19. This annular section tends to curl slightly as illustrated schematically in FIG. 2 and exposes an area of conductive tissue beneath the bark to the gelled chemical contained within the cavity 25 of the capsule 11 so that the natural fluids within the conductive tissue dissolve and transport the chemical throughout the tree.

The elasticity of the material in capsule 10 stores elastic energy, derived from the insertion of screw fastener 21 into the tree, to hold the capsule tightly to the tree and provide sealing pressure to prevent leakage at the sharpened edge 14. Leakage of the chemical around the screw fastener is prevented by the compression of boss 16 which applies pressure to sharpened edge 15 and provides a sealing surface between the screw head and the boss at the mating surface 22.

It is desirable that screw fastener 21 have a sharp pointed tip and sharp threads of relatively steep pitch. This minimizes the amount of energy required for insertion into green wood. A Philips-type screw head is advantageous, allowing for easy engagement with a powered screwdriver bit, and slippage when the screw fastener is driven to its correct depth, thereby ensuring that the sharpened edges of the capsule cut the bark sufficiently for a variety of bark thicknesses.

A special tool is not necessary in order to attach the injection capsule of the present invention to a tree; a single screwdriver able to engage and drive screw fastener 21 is all that is required. However, the injection capsule is preferably used with a special injection tool described in copending application serial No. 178,677 entitled "INJECTION TOOL FOR TREATING TREES" which allows for easy and rapid installation of the injection capsules on trees. The injection tool comprises a longitudinal tool with a specially shaped cavity at one end adapted to receive and hold the injection capsule of the present invention. The internal circumference of the cavity is fitted with an inwardly extending O-ring which is adapted to engage and hold flared edge 23 of the injection capsule thereby holding the injection capsule in place prior to installation on a tree. The injection tool is equipped with a powered rotary driving element which engages the screw fastener 21 of the injection capsule to quickly and efficiently drive the screw fastener into a tree.

The capsule 10 is preferably formed from a suitable plastic material, such as nylon, having sufficient strength that when metal fastener 21 is driven home, the sharpened edge 14 of open end 13 will penetrate bark 19 of tree 20. The capsules and screw fasteners are manufactured by automated machinery, and then assembled with the screw fastener in the bore. The gelled chemical is filled in the receptacle by automated machinery, and the filled capsules are packaged in groups and transported to the locations where trees are to be treated.

The injection capsule of the present invention allow trees to be quickly and efficiently treated and minimizes the exposure of potentially harmful chemicals to the environment. The present injection capsule confines the exposure of herbicidal chemicals to the tree or woody plant being treated and ensures that there is minimal risk of exposure to the operator.

In general, chemicals used for controlling the growth of trees are considered to be potentially harmful to people and fish. This limits their use in populated areas and near waterways. However, with the present invention the chemicals are contained in securely attached capsules, so that they can be used more routinely in such sensitive locations. In addition, the present capsule improves treatment performed in wet weather and in the dormant season. In wet weather the chemical is not washed away, and in the dormant season the chemical remains in the capsule until renewed circulation draws it into the tree.

An important factor in the acceptance by potential users of this method of applying herbicides or other chemicals to control tall growing vegetation is the capability of manufacturing the capsules inexpensively. The present invention provides an inexpensive, easily manufactured injection capsule suitable for mass production.

We claim:

1. An injection capsule to treat trees and woody plants comprising a receptacle portion to hold a chemical to treat trees and woody plants, said receptacle having a closed end and an open end, said open end having a sharpened edge, and said closed end being formed with a stem extending through the receptacle portion from said closed end to said open end, said stem having a sharpened edge adjacent said open end and having an internal bore extending therethrough housing fastening means movable along the length of said bore and guided by the walls of said bore to allow the injection capsule to be attached to a tree or woody plant, said bore being formed with a narrow diameter section to limit the travel of said fastening means whereby said fastening means is pushed through said internal bore and driven into a tree or woody plant in order to hold and seal the open end of said injection capsule tightly against said tree or woody plant, said sharpened edges of said open end and said stem acting to cut an annular hole in the tree or woody plant.

2. An injection capsule as claimed in claim 1 in which said closed end has a flared outer lip.

3. An injection capsule as claimed in claim 1 in which said capsule is moulded from resilient plastic.

4. An injection capsule as claimed in claim 1 in which said fastening means comprises a conventional screw housed within said internal bore.

* * * * *